United States Patent [19]
Galfidi, Jr.

[11] Patent Number: 5,704,154
[45] Date of Patent: Jan. 6, 1998

[54] WEAPON MOUNTED GAME CALLER

[76] Inventor: Joe Galfidi, Jr., 8738 Tyler Blvd., Mentor, Ohio 44060

[21] Appl. No.: 637,502

[22] Filed: Apr. 25, 1996

[51] Int. Cl.⁶ ............................................. A63H 5/00
[52] U.S. Cl. ..................... 42/90; 446/397; 446/207; 446/193; 116/139
[58] Field of Search .................. 446/397, 207, 446/208, 209, 202, 193; 116/139; 42/90

[56] References Cited

U.S. PATENT DOCUMENTS

| | | | |
|---|---|---|---|
| 677,113 | 6/1901 | Bruce | 446/193 |
| 1,627,467 | 5/1927 | Sparlin | 116/139 |
| 1,649,722 | 11/1927 | Munro | 446/193 |
| 2,238,035 | 4/1941 | Char | 446/193 |
| 2,594,013 | 4/1952 | Hahn | 116/139 |
| 2,782,558 | 2/1957 | Harley | 446/207 |
| 2,912,791 | 11/1959 | Cohen | 116/139 |
| 2,988,848 | 6/1961 | Lemelson | 446/193 |
| 3,416,488 | 12/1968 | Merl | 116/139 |
| 3,813,811 | 6/1974 | Herter | 446/193 |
| 3,900,993 | 8/1975 | Betters | 84/375 |
| 4,576,584 | 3/1986 | Hill | 446/193 |
| 4,917,645 | 4/1990 | Amici et al. | 446/193 |
| 5,490,672 | 2/1996 | Johnston | 446/193 |
| 5,577,946 | 11/1996 | Oathout | 446/208 |

*Primary Examiner*—Stephen M. Johnson
*Attorney, Agent, or Firm*—Joseph H. Taddeo

[57] ABSTRACT

This present invention relates to apparatus for use in hunting wild game animals and waterfowl, and more particularly to a weapon mounted wild animal game caller. This weapon mounted wild animal game caller finds particular application in attracting deer. It may be conveniently mounted and attached to an archery bow or to a hunting firearm. The game caller emits a grunting sound which is know to attract game animals, such as deer. The use of the grunter is very desirable for short range hunting making it the choice for many bow hunters. The activation of sound is accomplished by a novel air bladder that is filled with a resilient filamentous polyester type fiber. When mounted to an archers bow, it is easily operated with the hand even with a fully drawn bow.

27 Claims, 4 Drawing Sheets

WEAPON MOUNTED GAME CALLER

FIELD OF INVENTION

The present invention relates to apparatus for use in hunting wild game animals and waterfowl, and more particularly to a weapon mounted wild animal game caller. This weapon mounted wild animal game caller finds particular application in attracting deer. It may be conveniently mounted and attached to an archery bow, crossbow or to a hunting firearm.

BACKGROUND OF THE INVENTION

There are many devices in use today to attract wild game animals. Typically, these wild game animals include deer, moose, elk, wild fowl and waterfowl, or even turkeys. These devices that produce sound to attract the wild game are often referred to as game callers. Rattling horns, both large and small are commonly used to create sounds that will attract deer.

Large horns have one major advantage—volume. They can be heard for long distances, or in thick cover. However, they also have disadvantages, mostly in carrying them around. Horns can be hung on a thong looped around the hunter's neck, but large antlers clatter on everything else that is carded from binoculars to a rifle. They can also present a safety problem, since there are people in the woods who will shoot at horns regardless of what neck they're hanging from. For this reason some hunters paint their horns hunter orange.

Deer can hear small horns at surprising distances. The hunter need only to "tickle" the small horns several times to attract deer. Some bow hunters rattle an aluminum arrow against the wooden riser of the bow to call in bucks. Still other hunters use "rattling bags," small bags full of bone chips or other hard material, that simulate the light ticking of tines. They can be worked with one hand, with very little movement.

Still, many other hunters prefer a grunt call for close work, partially because it provides another type of sound. Unlike a rattling bag, a small grunt call doesn't even need one hand to work, leaving both hands free for your rifle or bow. Many calls are mouth-operated by blowing into them. Some calls require hunters to grunt vocally with their throats as they blow into the caller.

Sometimes it helps to provide other sound effects. Some of these devices are treadle operated by stepping on them with ones foot.

U.S. Pat. No. 4,237,615, granted Dec. 9, 1980, P. A. Bracknell, discloses a sight mount for an archery bow embodying a bracket to be mounted upon a bow.

U.S. Pat. No. 5,123,396, granted Jan. 23, 1992, to P. Shepley, et al., teaches of an accessory mount for a removable rigid securement of an accessory to an archery bow. The accessory mount provides for the mounting of a quiver to store more arrows, an overdraw mechanism or a sight.

U.S. Pat. No. 5,419,304, granted May 30, 1995, to R. K. Pardue, discloses a mounting jig that is removable and coupleable to a hunting bow, adapted to receive a removable turkey caller.

U.S. Pat. No. 5,431,590, granted Jul. 11, 1995, to F. M. Abbas, discloses an apparatus for calling game animals when the user is hunting with an archery bow. A game attracting call is sounded when the user either draws or blows air through a conduit which is connected to the bow mounted game caller.

There are many problems associated with using the apparatus described. Many of the devices require two hands to operate the device; some only one hand. There are calls that must be held in the mouth which can cause fatigue to the hunter holding the device. Foot operated apparatus is awkward at best, therefore does not find much application in deer hunting. Others may emit undesirable sounds at inappropriate times, thereby "spooking" the prey. The nature of the hunt requires that a bow hunter will be able to silently operate the caller device even with a fully drawn bow.

What is needed is a small, lightweight, reliably operated caller that can be mounted to a hunting weapon, such as to a hunting bow or firearm, to attract deer and other wild game. In this regard, this invention fulfills this need.

SUMMARY OF THE INVENTION

The present invention is a pressure operated apparatus for attracting by calling game animals, such as deer, moose and elk while hunting with a bow. Its use is not limited to mounting or attaching to an archery bow, but can find application in mounting to a firearm as well.

The game attractor consists of a grunter that is made to be sounded by blowing air through a conduit, past a reed that vibrates, creating a simulated deer grunting sound. Using a caller in this manner, which is attachable to the hunter's bow, crossbow or firearm, frees the arms and hands of the archer to sound the device while holding a drawn bow.

An air bladder, fabricated from a sheet vinyl material, attached to the sounding device, serves as an air bladder that when squeezed or compressed, forces the air through the caller and across the reed. Internal to the jacketed bladder is a cushioning material comprised of a resilient filamentous polyester type fiber that restores the bladder to its original shape, while allowing air to be again silently filling the bladder for its next compression.

There are no extraneous noises produced by the compression of the vinyl bladder or the resilient polyester fiber. Silent operation is essential to prevent scaring away the prey. Even the vinyl air bladder is designed to be free from emitting noise, even if inadvertently rubbed by ones jacket or by a hunting shaft. The vinyl material selected is both soft and pliable and has a rapid recovery to its original shape even during the cooler autumn months.

The air bladder driven grunter can be mounted near the central portion of the bow where it can be operated by slight pressure exerted by the archer's hand. It can be secured by a hook and pile attachment system (Velcro) or by plastic thongs.

It is therefore an object of this invention to provide for a wild game caller that is driven by an air bladder system.

It is another object of this invention to provide for a wild game caller that is driven by an air bladder system, said air bladder being filled with a highly resilient, rapid recovery polyester fiber.

It is still another object of this invention to provide for a wild game caller that is driven by an air bladder system, said air bladder being comprised of materials that is free from inadvertently generating any extraneous sounds that are distracting to the prey.

Yet, it is still another object of this invention to provide for a wild game caller system that is attached to an archery bow by using hook and loop securing device.

Further, it is another object of this invention to provide for a wild game caller system that is attached to a hunter's firearm by using hook and loop securing device.

Lastly, it is another object of this invention to provide for a wild game caller system that is easily operated by the bowman even with the bow being fully drawn.

DESCRIPTION OF THE PREFERRED EMBODIMENTS

Presently available grunters are designed to be sounded by blowing air or by drawing air across the reed found internal to the nylon grunter. Present callers retained on a hunter's neck or jacket require movements with potential rustling noises for use. This type of design is awkward and cumbersome especially to the hunter that is using an archery bow to hunt with. Grunters which are clamped by a hunter's teeth may interfere with aiming and firing techniques. Even though the bowman's hands are free to draw the bow, it is quite fatiguing to hold a grunter in one's mouth by clenching ones' teeth.

Figure 1A:
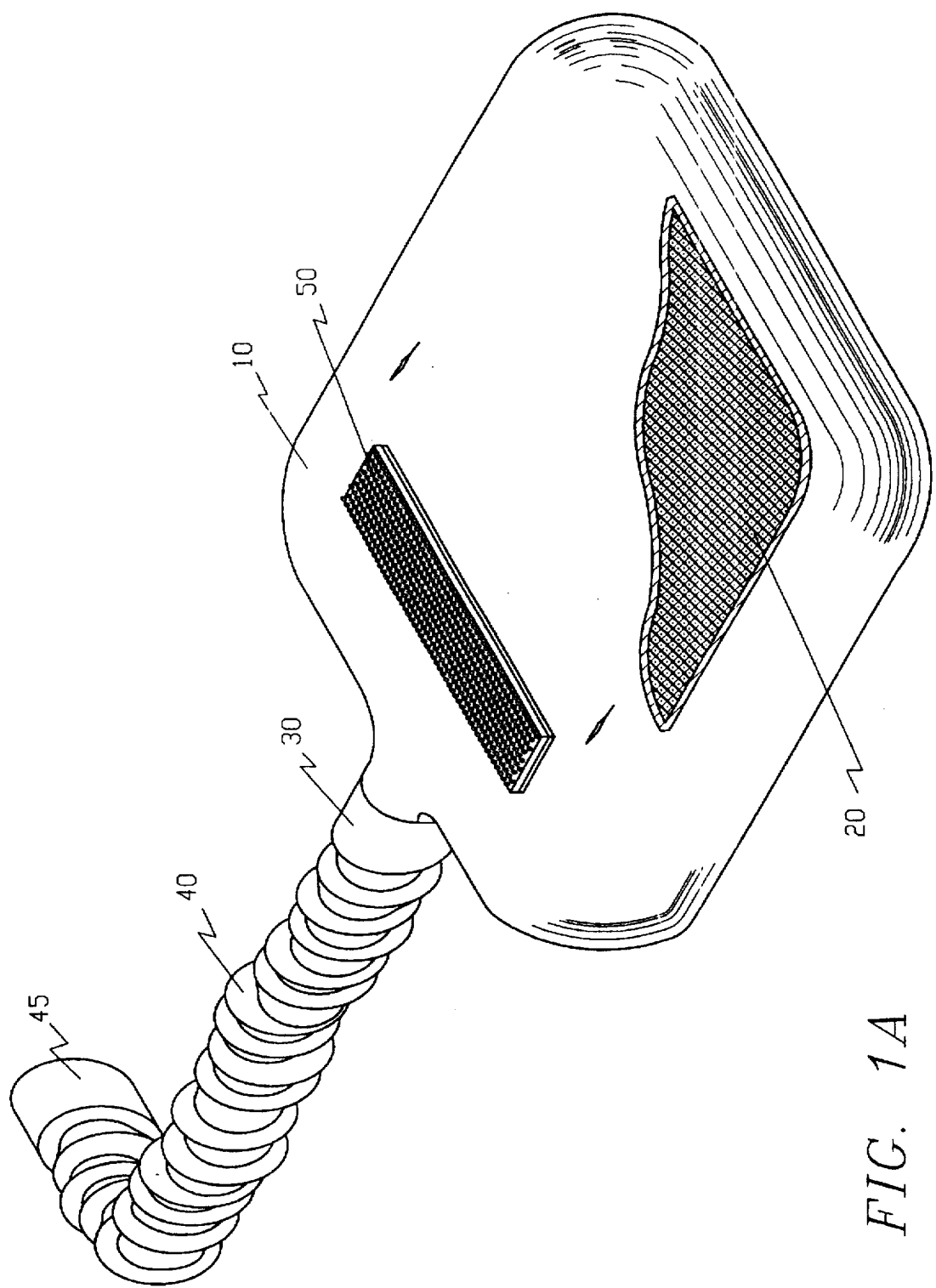
FIG. 1a is a perspective drawing of the air bladder driven grunter system detailing a cutaway portion showing the resilient polyester fiber.

FIG. 1a is a perspective drawing of the invention 5, which shows the air bladder driven grunter in its preferred embodiment. The present invention uses a vinyl air bladder 10 as the source of air to operate the grunter. The air bladder comprises an exterior jacket which is made of a soft pliable vinyl material. The bladder is preferably filled with a material which is shredded or fragmented, so that there are interstitial air-filled spaces between the shreds. More preferably, that material is a resilient filamentous polyester type fiber 20. This material having interstices between the fibers is selected to have a rapid recovery of shape after once being squeezed or compressed. A further selection criterion for the air bladder and polyester fiber is that they emit no undesirable noises when in use.

When the air bladder is controllably depressed, as a bowman would do by exerting a force with the hand, there is a passage of air through the nylon grunter 30. Internal to the grunter is a reed 32 which is set into vibration when a volume of air passes across it. It is the size and shape of the vibrating reed that gives it the grunting capability when short bursts of air are passed through it.

The sound that is created by the vibrating reed then passes through a flexible nylon conduit 40, and through an acoustic concentrator 45, which provide an added dimension to the authenticity of the grunting sound.

Upon the release of pressure on the air bladder, there is a rapid recovery to the shape of the air bladder. As the original shape is restored, air is now drawn in through the acoustic concentrator 45 and through nylon conduit 40, then silently passing through the nylon grunter 30, into the now fully expanded air bladder. Slits 15, that are cut through the bladder jacket, increase the rate at which the bladder recovers and refills with air.

Figure 1B:
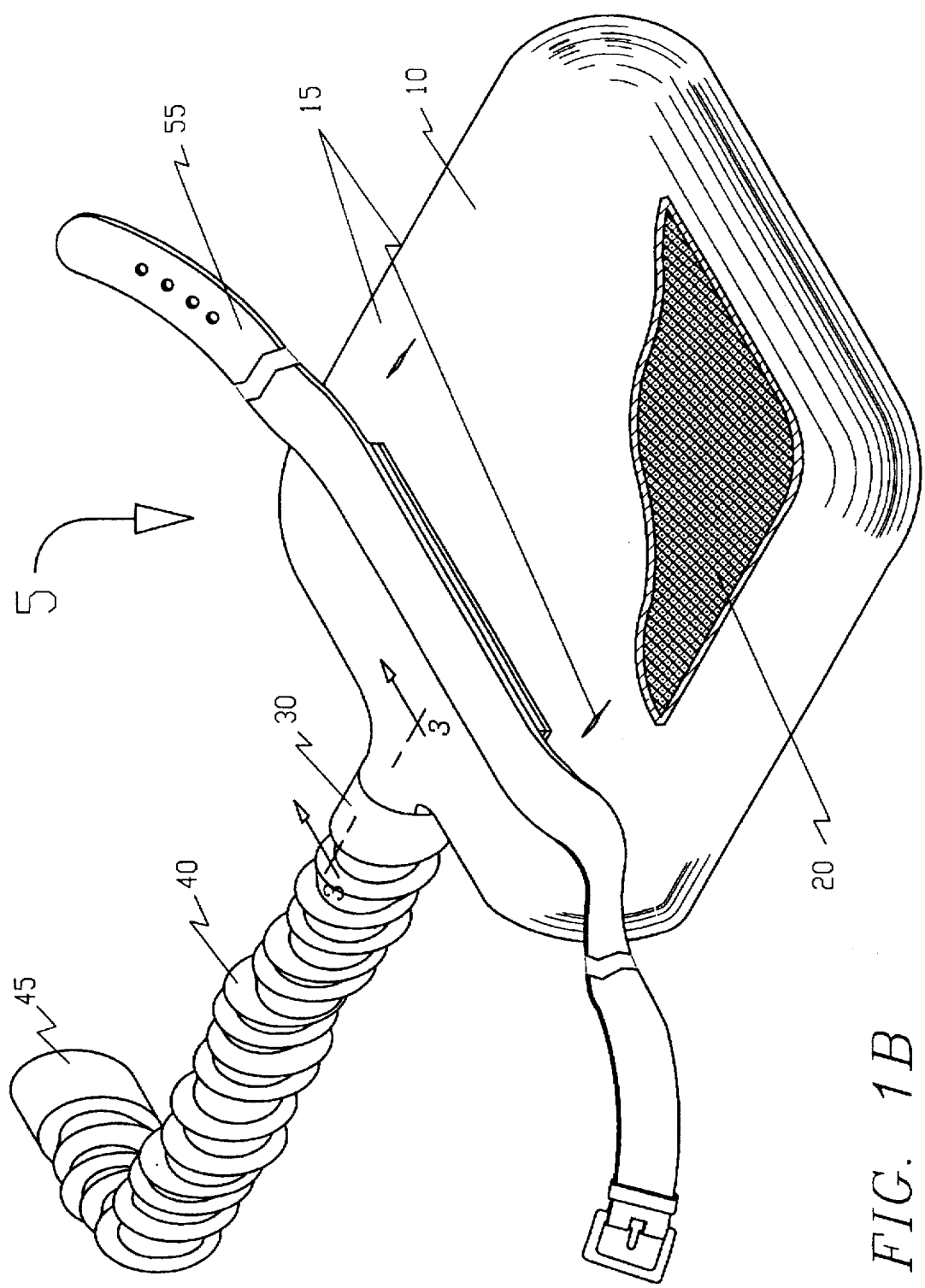
FIG. 1b is a perspective drawing of the air bladder driven grunter system detailing a cutaway portion, showing the resilient polyester fiber, and the Velcro laden strap attachments.

The air bladder driven grunter can be attached to an archery bow by tethering if to the bow or by securing it with a hook and pile Velcro device 50. As shown in FIG. 1b, the grunter can also be attached to the weapon by means of a strap or belt 55, which is adhered to the bladder jacket and extends around the bow or firearm. The strap or belt 55 is laden with Velcro 50 for mating the strap ends to mount the grunter on the weapon with the desired tightness and security. Thongs 55a, shown in FIG. 2a and FIG. 2b, provide another means for tethering the caller to the bow or other weapon.

Figures 2A, 2B:
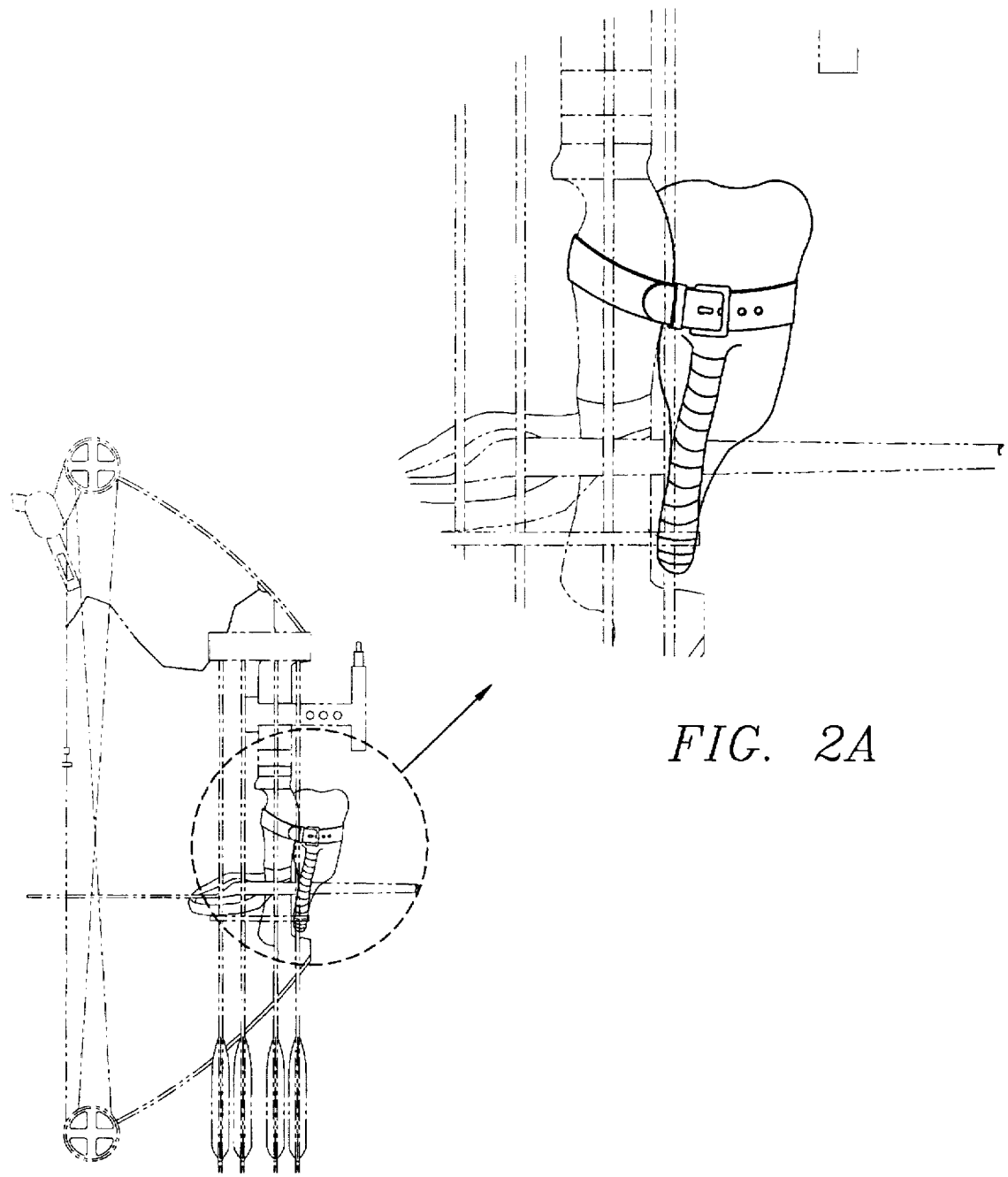
FIG. 2a is a close-up side elevational view of an archery bow showing the preferred mounting area of the air bladder driven grunter.
FIG. 2b is a side elevational view of an archery bow showing the preferred mounting area of the air bladder driven grunter.
Figure 3:
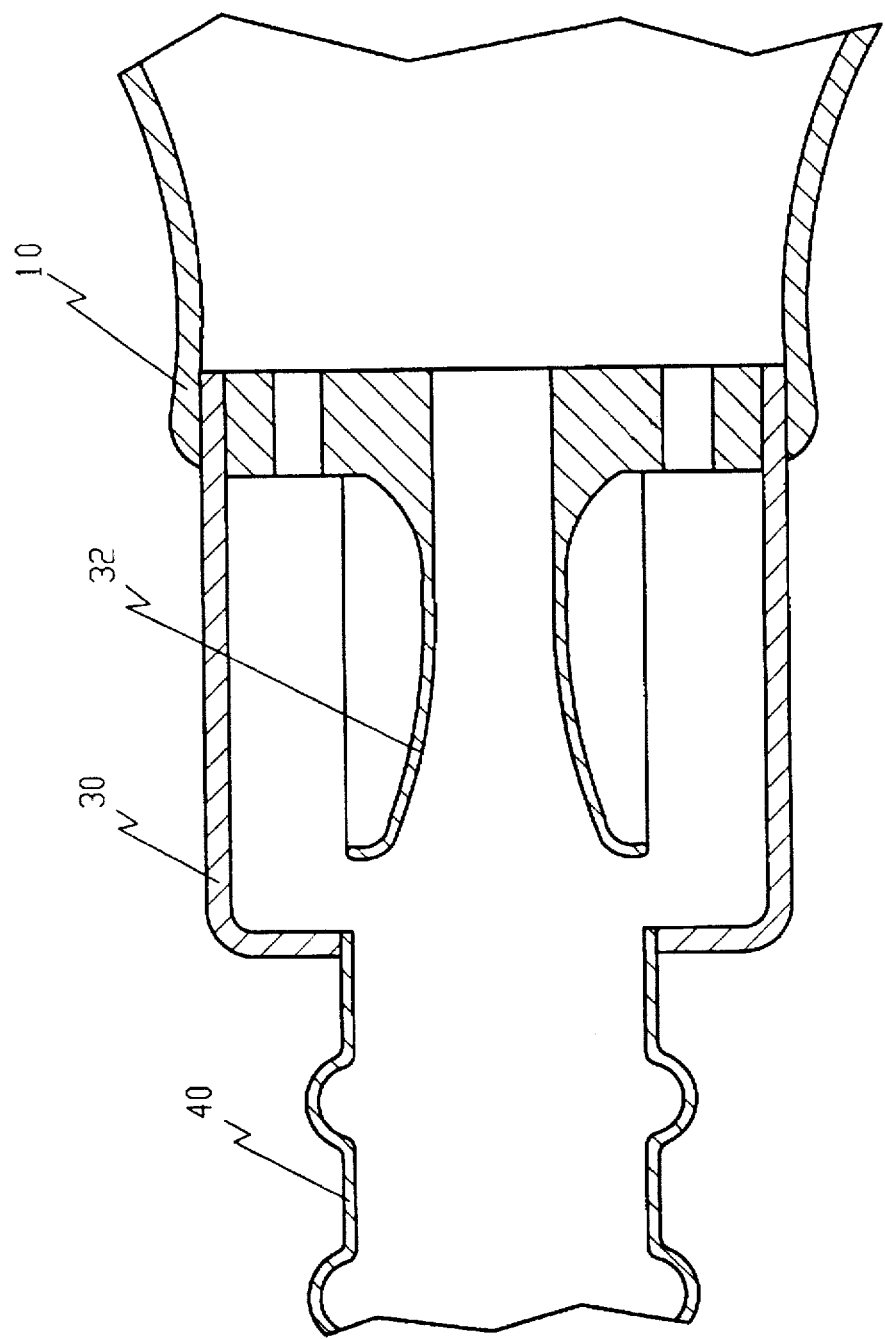
FIG. 3 is a cutaway view of the grunter with encased reed, shown along line 3—3 of FIG. 1b.

Turning now to FIG. 2b, shown is a side elevational view of an archery bow 60 with the air bladder driven grunter 70 mounted to it. The grunter assembly 70 is mounted in a convenient position so that it can be easily operated even with a fully drawn bow.

FIG. 2a is an expanded side view of the central portion of the bow showing the preferred placement of air bladder driven grunter assembly 70.

There may be other improvements, modifications and embodiments that will become apparent to one of ordinary skill in the art upon review of this disclosure. As such, these improvements, modifications and embodiments are considered to be within the scope of this invention as defined in the claims and equivalents thereof.

I claim:

1. A caller for mounting on a hunting weapon to attract game animals with the caller while operating the weapon, comprising:

a grunter sounding device having a conduit that includes a grunter with an encased reed, for sounding the device by air passage through the grunter and over the reed that vibrates for making a deer grunting sound;

an air bladder attached to the sounding device, the bladder having an outer jacket adapted to be compressed to force air through the caller and across the reed; and, means for mounting the caller to the weapon, the means for mounting associated with the caller.

2. A game caller according to claim 1, wherein the conduit is a flexible piece; and, further comprising an acoustic concentrator connected to the conduit for enhancing the grunting sound upon a compression of the bladder and for a return of air through the concentrator to the bladder.

3. A game caller according to claim 2, wherein the weapon comprises an archer's bow with a central portion, the caller mounted at the central portion for sounding the caller while the bow is drawn; and, wherein the air bladder comprises a sheet of soft, pliable vinyl material having an original, air-filled shape.

4. A caller for attracting game animals according to claim 3, further comprising a means for recovery of the bladder to its original air-filled shape, the means for recovery positioned within the bladder for restoring the bladder to its original air-filled shape following a compression, while allowing air to silently refill the bladder for its next compression.

5. A game caller as described in claim 4, wherein the means for recovery comprises an interstitial material, the material contained within the bladder.

6. A game caller according to claim 5, wherein the material contained within the bladder comprises a resilient polyester fiber, that emits no frictional, extraneous noises upon compression thereof.

7. A game caller according to claim 6, wherein the conduit is constructed of a material comprising nylon.

8. A game caller according to claim 7, wherein the means for mounting the caller comprises a pressure sensitive adhesive.

9. A game caller according to claim 7, wherein the means for mounting the caller comprises a hook and loop securing arrangement.

10. A game caller according to claim 9, wherein the hook and loop securing arrangement comprises VELCRO.

11. A game caller according to claim 7, wherein the means for mounting comprises a belt having two ends, the belt adhered to the bladder jacket and extending around the weapon, the belt laden with hook and loop material for securing the caller to the weapon with a tight connection.

12. A game caller according to claim 11, further comprising at least one slit through the bladder jacket to increase a rate of restoring the bladder to the original shape by refilling the bladder with air.

13. A game caller according to claim 7, wherein the means for mounting the caller comprises thongs for tethering the caller to the weapon.

14. A caller for attracting game animals, comprising:
   a grunter sounding device having a conduit with an encased reed, for sounding the device by air passage through the conduit and over the reed that vibrates for making a deer grunting sound;
   an air bidder attached to the sounding device, the bladder having an outer jacket adapted to be compressed to force air through the caller and across the reed; an acoustic concentrator connected to the reed conduit for emitting the grunting sound upon a compression of the bladder and for a return of air through the concentrator to the bladder; wherein the air bladder comprises a sheet of soft, pliable vinyl material having an original, air-filled shape; a means for recovery of the bladder to its original shape, positioned within the bladder, wherein the means for restoring the bladder comprises a material having fragments with interstices therebetween, the material contained within the bladder.

15. A game caller according to claim 14, wherein the material contained within the bladder comprises a resilient filamentous polyester fiber, that emits no frictional, extraneous noises upon compression thereof.

16. A caller for attracting game animals, comprising:
   a grunter sounding device for making a deer grunting sound,
   an air bladder attached to the sounding device, the bladder having an outer jacket adapted to be compressed and to emit the grunting sound, and
   further comprising a means for mounting the caller to a weapon, the means for mounting associated with the caller.

17. The caller according to claim 16, further comprising a flexible conduit connected to the grunter device for attracting game animals.

18. The caller of claim 17, further comprising an acoustic concentrator connected to the conduit to further authenticate the grunting sound.

19. The caller according to claim 18, wherein the weapon comprises an archer's bow with a central portion, the caller mounted at the central portion, for silent operation of the caller while the bow is drawn.

20. The caller described in claim 19, wherein the air bladder comprises a pliable material.

21. The caller of claim 20, wherein the bladder has an original air-filled shape.

22. The caller of claim 21, further comprising a means for recovery of the bladder to its original shape, the means for recovery installed in the bladder.

23. The caller as described in claim 22, wherein the means for recovery the bladder comprises solid matter.

24. The caller according to claim 23, wherein the solid matter comprises a material having interstices.

25. The caller according to claim 24, wherein the material contained within the bladder comprises a resilient filamentous polyester fiber, that emits no frictional, extraneous noises upon compression thereof.

26. The caller according to claim 25, wherein the conduit is constructed of a material comprising nylon.

27. The caller according to claim 26, wherein the means for mounting the caller comprises a plurality of alternatives selected from the group consisting of a pressure sensitive adhesive, a hook and loop securing arrangement, VELCRO, a belt, and thongs.

* * * * *